(12) United States Patent
Huang

(10) Patent No.: US 11,576,362 B2
(45) Date of Patent: Feb. 14, 2023

(54) QUICK-RELEASE FISHING ROD BUTT SECTION

(71) Applicant: Rex H. Huang, Sandy, UT (US)

(72) Inventor: Rex H. Huang, Sandy, UT (US)

( * ) Notice: Subject to any disclaimer, the term of this patent is extended or adjusted under 35 U.S.C. 154(b) by 0 days.

(21) Appl. No.: 17/099,702

(22) Filed: Nov. 16, 2020

(65) Prior Publication Data

US 2021/0144985 A1    May 20, 2021

Related U.S. Application Data

(60) Provisional application No. 62/935,535, filed on Nov. 14, 2019.

(51) Int. Cl.
*A01K 97/10* (2006.01)
*B63B 17/00* (2006.01)
*A01K 97/08* (2006.01)

(52) U.S. Cl.
CPC .............. *A01K 97/10* (2013.01); *A01K 97/08* (2013.01); *B63B 17/00* (2013.01)

(58) Field of Classification Search
CPC ........ A01K 97/10; A01K 97/11; A01K 97/08; B63B 17/00
USPC .............. 248/514, 515, 516, 518, 519, 521; 206/315.11, 443; 403/46
See application file for complete search history.

(56) References Cited

U.S. PATENT DOCUMENTS

| | | | |
|---|---|---|---|
| 32,377 A | 9/1868 | Bradley | |
| 156,282 A * | 10/1874 | Darby | A01K 97/10 248/515 |
| 314,290 A * | 3/1885 | Haitz | A01K 97/10 248/515 |
| 1,038,203 A | 9/1912 | Ricketts | |
| 1,154,123 A | 9/1915 | Manning | |
| 1,459,438 A * | 6/1923 | Brand | A01K 97/10 248/514 |
| 1,985,985 A * | 1/1935 | Gerline | A01K 97/10 224/200 |
| 2,146,350 A * | 2/1939 | Roberts | A01K 97/10 224/200 |
| 2,312,957 A * | 3/1943 | Cannon, Jr. | A01K 97/10 248/514 |
| 2,682,127 A * | 6/1954 | Binder | A01K 97/10 43/21.2 |
| 2,753,646 A | 7/1956 | Colmery | |
| 2,839,865 A * | 6/1958 | Lubanski | A01K 97/10 43/26 |
| 3,051,422 A * | 8/1962 | Crump | A01K 97/10 248/518 |
| 3,053,004 A | 9/1962 | Baker | |
| 3,708,141 A * | 1/1973 | Friedgen | A01K 97/10 248/515 |
| 4,017,998 A * | 4/1977 | Dumler | A01K 97/10 43/21.2 |
| 4,635,390 A * | 1/1987 | Walters | A01K 97/10 248/538 |

(Continued)

*Primary Examiner* — Nkeisha Smith
(74) *Attorney, Agent, or Firm* — Morris O'Bryant Compagni Cannon, PLLC

(57) ABSTRACT

An apparatus for coupling a fishing rod to a rod holder comprises a rod butt holder attached to a fishing rod and selectively and releasably attached to rod holder support arm. The rod holder support arm includes a retaining portion configured to be selectively and releasably attached to the rod butt holder. A latch assembly is coupled to the rod butt holder to releasably secure the rod butt holder to the rod holder support arm.

13 Claims, 5 Drawing Sheets

(56) References Cited

U.S. PATENT DOCUMENTS

| | | | | |
|---|---|---|---|---|
| 5,219,134 A | * | 6/1993 | Morita | H02G 3/26 248/224.7 |
| 5,460,306 A | * | 10/1995 | Rudd | A01K 97/10 224/535 |
| 5,564,217 A | * | 10/1996 | Riedell | A01K 97/10 43/21.2 |
| 6,269,584 B1 | * | 8/2001 | Peaschek | A01K 97/10 43/21.2 |
| 7,086,195 B2 | * | 8/2006 | Borgeat | A01K 87/06 43/18.1 CT |
| 7,089,699 B2 | | 8/2006 | Borgeat | |
| 7,114,281 B2 | * | 10/2006 | Miller | A01K 97/10 43/21.2 |
| 7,114,282 B2 | | 10/2006 | Nakagawa | |
| 7,131,232 B1 | * | 11/2006 | Fecht | A01K 97/10 43/21.2 |
| 7,621,066 B1 | | 11/2009 | Mathison | |
| 7,757,424 B2 | * | 7/2010 | Follmar | A01K 97/10 43/21.2 |
| 7,849,630 B2 | * | 12/2010 | Carnevali | A01K 97/10 43/21.2 |
| 8,033,046 B2 | * | 10/2011 | Morehead | A01K 97/10 43/21.2 |
| 8,966,808 B2 | * | 3/2015 | Huang | A01K 87/06 43/22 |
| 2005/0172534 A1 | * | 8/2005 | Arcabascio | A01K 91/08 43/21.2 |
| 2007/0246589 A1 | | 10/2007 | Martin et al. | |
| 2008/0203207 A1 | * | 8/2008 | Krauland | A01K 97/06 242/287 |
| 2008/0308663 A1 | | 12/2008 | Hiraoka et al. | |
| 2009/0032631 A1 | | 2/2009 | Koelewyn | |
| 2011/0239518 A1 | | 10/2011 | Zuckerman | |
| 2016/0212980 A1 | * | 7/2016 | Hodges | A01K 87/025 |

\* cited by examiner

QUICK-RELEASE FISHING ROD BUTT SECTION

CROSS-REFERENCE TO RELATED APPLICATION

The present application claims priority to U.S. Provisional Patent Application Ser. No. 62/935,535 filed on Nov. 14, 2019, the entirety of which is incorporated by this reference.

BACKGROUND OF THE INVENTION

Field of the Invention

The present invention relates generally to fishing rods and more specifically to a fishing rod that includes a quick release that allows the fishing rod to lock on to a rod holder arm which can be attached to a variety of bases and a chest harness.

Description of the Related Art

Current fishing rod holders all use the handle and butt section of a fishing rod to hold the fishing rod in a tube or cradle. Current rod holders have a diameter larger than the diameter of the fishing rod handle and butt section where the fishing rod is inserted and held in place by gravity. Current rod holders are bulky, often require two hands to remove the fishing rod and fishing rods fall out of the rod holder when a kayak or other water vessel capsizes. Current fishing rod handles are cork or foam attached with an adhesive to the fishing rod blank. Butt sections below the handle are typically plastic, rubber, foam or cork attached to the fishing rod blank with adhesive.

U.S. Pat. No. 8,966,808B2 issued on Mar. 3, 2015 to Rex H. Huang, the entirety of which is incorporated by this reference, discloses a fly fishing rod with a detachable reel and reel seat assembly. The fly fishing rod comprises a rod shaft and a handgrip disposed at an inner end rod shaft, and is adapted for removably connecting a reel to the handgrip by means of a hollow cylindrical reel seat. The rod shaft of the fly fishing rod has a portion extending past the handgrip so as to mount the reel thereon through the reel seat, rearwardly of the handgrip. A sleeve like adapter is engaged over the shaft portion and comprises a locking groove. The reel seat is slidable over the adapter and has a stud portion arranged to be engaged in the locking groove for connecting the reel seat to the handgrip, and to be removed thereon by disengaging the stud portion from the locking groove, thereby making it possible to dispose the reel seat away from the fly fishing rod. The disclosure of the present invention also relates to a reel and reel seat assembly holding device and a waist holder for the holding device.

There exists a need in the art, however, to provide a fishing rod that includes a quick release mechanism that allows the fishing rod to be attached to a rod holder arm that can be attached to a variety of bases and a chest harness and that allows the fishing rod to be quickly and easily released from the rod holder arm when desired.

SUMMARY OF THE INVENTION

According to one embodiment of the fishing rod described herein allows the fishing rod to be locked on to a rod holder arm using only one hand.

According to another embodiment of the fishing rod of the present invention, amputees and those who only have the use of one arm are be able to utilize the reel of the fishing rod with one hand without having to also hold the fishing rod.

In another embodiment of the fishing rod of the present invention, the fishing rod can be releasably attached to a chest harness or other device.

These and other aspects of the present invention may be realized in a fishing rod assembly as shown and described in the following figures and related description.

BRIEF DESCRIPTION OF THE DRAWINGS

The present application includes multiple drawings to illustrate specific aspects of claimed embodiments. These drawings provide examples of specific combinations of structures and features of the claimed embodiments, and those structures and features may be combined in other ways consistent with the detailed description and claims recited in the present application. The scope of the claims should not be limited to any particular embodiment(s) of the drawings where such further combinations are expressly or inherently presented through the drawings or accompanying descriptions.

FIG. 2A is a partial cross-sectional close up view of a portion of the apparatus shown in FIG. 2.

Figure 1:
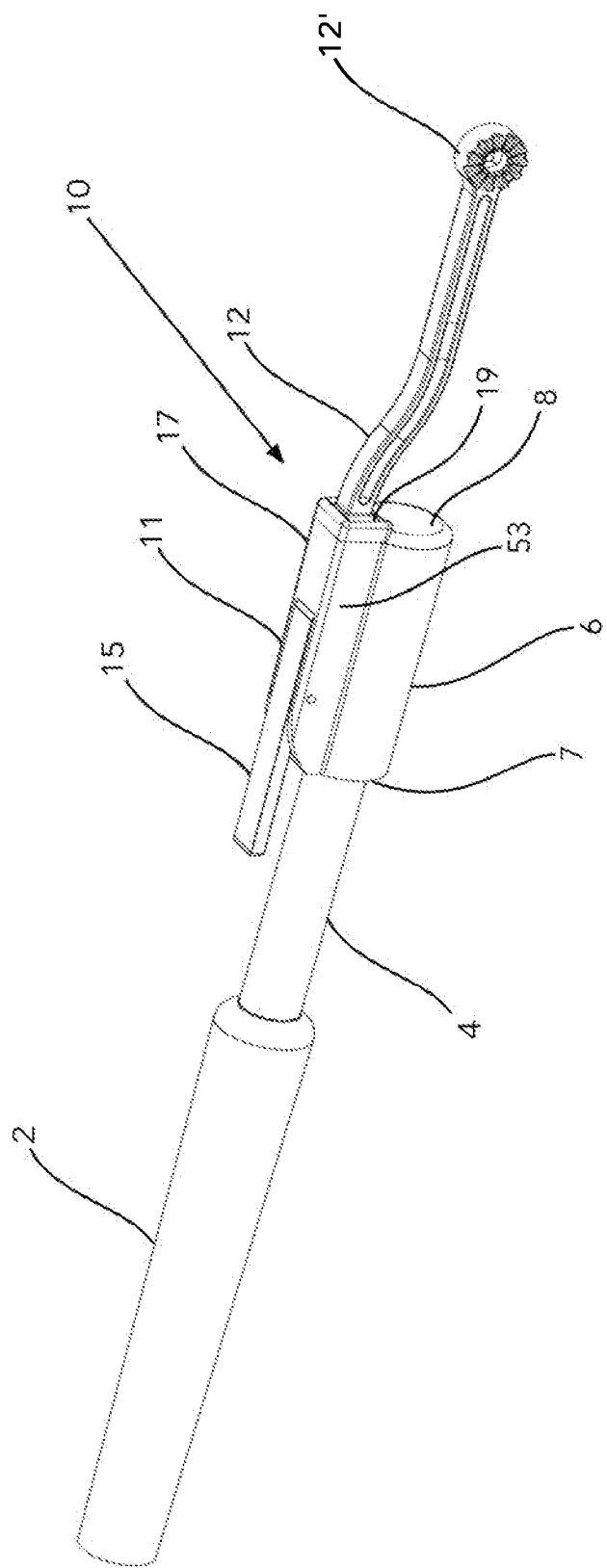
FIG. 1 is a perspective left side view of an apparatus for coupling a fishing rod to a rod holder arm in accordance with the principles of the present invention.

The embodiments shown accomplish various aspects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention. Elements and acts in the figures are illustrated for simplicity and have not necessarily been rendered according to any particular sequence or embodiment.

DETAILED DESCRIPTION OF THE INVENTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims. Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors fully informed of the standards and application of the special provisions of 35 U.S.C. § 112(f). Thus, the use of the words "function," "means" or "step" in the Detailed Description of the Invention or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for" and the specific function, without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. Thus, the full scope of the inventions is not limited to the examples that are described below.

Figure 2:
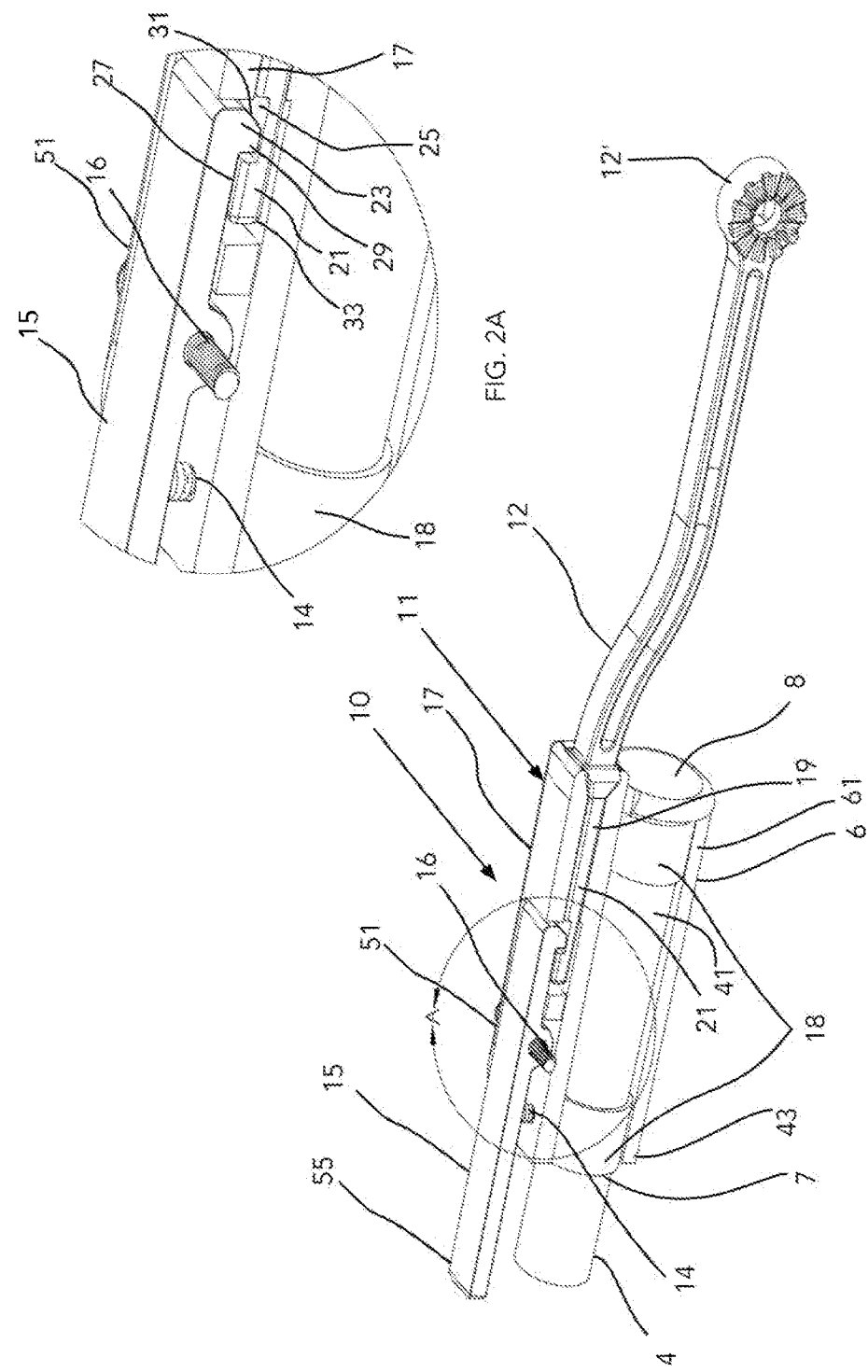
FIG. 2 is a partial cross-sectional left side view of the apparatus illustrated in FIG. 1.

As shown in FIGS. 1 and 2, the present invention comprises a selectively releasable fishing rod butt assembly, generally indicated at 10, that couples a conventional fishing rod blank 4 to a rod holder arm 12.

The rod butt assembly 10 comprises a rod butt holder 6 that is attached to a proximal end of the fishing rod blank 4. The rod butt holder 6 is generally a hollow cylinder defining a chamber or tubular opening at a distal end 7 sized to receive therein the proximal end 9 of the fishing rod blank 4. Coupled to or integral therewith is a latch assembly, generally indicated at 11. The latch assembly 11 includes rod holder arm receptacle 17 that defines a rectangular channel 19 for receiving a distal end 21 of a rod holder arm 12. A latch 15 is pivotally coupled to the rod holder arm receptacle 17 and is biased into a latched or locked position as shown in FIGS. 1 and 2. As further shown in FIG. 2A (which is a close up view of portion A identified in FIG. 2, when the distal end 21 of the rod holder arm 12 is sufficiently inserted into the receptacle 17 of the rod butt assembly 10, the proximal end 23 of the latch 15 will be lifted by the distal end 21 of the rod holder arm 12 until the proximal end 23 is received within the transverse notch 25 formed in the top surface 27 of the rod holder arm and the proximal end of the latch 15, which includes a downwardly depending locking portion 29 engages with the notch 25 of the rod holder arm 12 and locks the rod holder arm 12 in place relative to the rod holder arm receptacle 15. In order to cause the proximal end 23 of the latch 15 to raise against the biasing force of the spring 14 as the distal end 21 of the rod holder arm 12 engages the proximal end 23 of the latch 15, the proximal end locking portion 29 include a lower chamfered or beveled edge 31 and the distal end 21 of the rod holder arm 12 includes a chamfered or beveled end 33. When the end 33 of the rod holder arm 12 engages the beveled edge 31 of the locking portion 29, the two can slide relative to one another until the end 33 passes the beveled edge 31 and until the beveled edge 31 resides within the notch 25.

As shown in FIG. 2, which illustrates a partial cross-sectional view of the rod butt holder 6 and the receptacle 17 with the fishing rod blank 4 inserted into the cylindrical cavity of the rod butt holder 6. In this embodiment, arbor tape 18, comprising layers of masking or other adhesive tape wrapped around the proximal end of the fishing rod blank 4 make up the difference between the outside diameter of the fishing rod blank 4 and the inside diameter of the rod butt holder 6 so as to form a tight friction fit between the outside surface of the arbor tape 18 and the inside surface of the rod butt holder 6. As shown, the arbor tape 18 may be placed at more than one location along the portion of the rod blank 4 that is inserted into the rod butt. In this embodiment, two wraps of arbor tape 18, one at the proximal end 41 of the rod blank 4 and another at a distance spaced from the proximal end of the rod blank 4 adjacent the distal end 43 of the rod butt holder 6 so that the proximal end of the rod blank 4 is secured to the rod butt holder 6 a proximal end 41 and a distal end 43 thereof. While securely holding the proximal end 41 of the rod blank 4 relative to the rod butt holder 6 by friction fit, the use of arbor tape 18 may allow the rod blank 4 to be removed from the rod blank holder 4 without damage to the rod blank 4, but is generally configured to permanently attach the rod blank 4 to the rod butt holder 6. Alternatively, however, the rod blank 4 could be even more permanently attached to the rod butt holder 6 if desired by using an adhesive between the rod blank 4 and the rod butt holder 6, such as an epoxy-based adhesive or other materials known in the art. Likewise, other mechanical means of fastening the rod blank 4 to the rod butt holder 6 are also contemplated, such as the use of fasteners, clamping mechanisms, threaded engagement or the like could be used to fasten the rod butt holder 6 to the proximal end of the rod blank 4.

As further shown in FIG. 2, the downwardly depending locking portion 29 at the proximal end 23 of the latch 15 engages with the transversely extending groove, slot, channel or notch 25 formed in the distal end 21 of the rod holder arm 12. The latch 15 is pivotally coupled relative to the rod butt holder 6 with a bolt or latch pin 16 that extends through and is attached to the side walls 51 and 53 (see FIG. 1). The latch 15 can freely pivot from a first locked position as shown in FIG. 2 to a second unlocked position when the latch 15 is pivoted relative to the latch pin in a manner that lowers the distal end 55 and raises the proximal end 23 of the latch 15 until the locking portion 29 is released from the notch 25 and the rod holder arm 12 can be removed from the receptacle 17. That is, when the distal end of the rod holder arm 12 is fully inserted into the rod holder arm receptacle 17, the locking portion 29 at the proximal end 23 of the latch 15 engages the transverse slot or notch 25 in the distal end 21 of the rod holder arm 12 and secures it relative to the rod holder receptacle 17. This in turn secures the rod blank 4, which is attached to the rod butt holder 6, to the rod holder arm 12.

Figure 3:
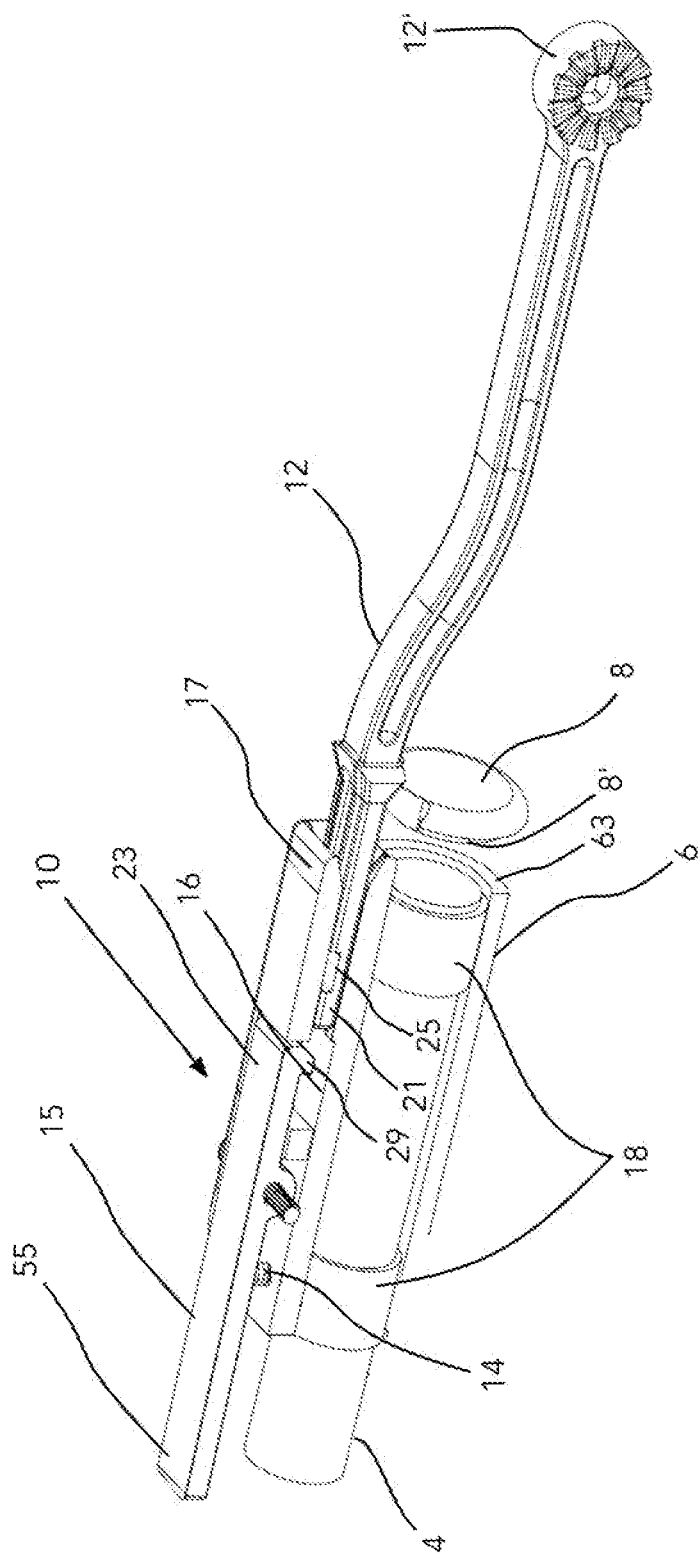
FIG. 3 is a partial cross-sectional left side view of the apparatus illustrated in FIG. 1 with the rod holder arm disengaged from the rod butt.

As shown in FIG. 3, to release the rod blank 4, and more particularly the rod butt holder 6, from the rod holder arm 12, the distal end 55 of the lever 15 is downwardly pressed toward the rod blank 4 so as to cause the lever to overcome the force of the coil spring 14 and pivot the lever 15 sufficiently to allow the proximal end of the lever 15 to raise relative to the distal end 21 of the rod holder arm 12 until the locking portion 29 of the lever 15 disengages from the transverse slot 25 in the distal end 21 of the rod holder arm 12. The distal end 21 of the rod holder arm 12 can then be removed from the rod holder receptacle 17 by sliding it out of the rod holder receptacle 17. Pivoting the lever 15 to raise the proximal end 23 of the lever 15 to release the rod holder arm 12 can be easily accomplished by a user when grasping the rod butt holder 6 in the fingers and pressing the distal end 55 of the lever 15 with the thumb. The rod butt holder 6 can then be removed from the rod holder arm 12 by pulling the receptacle 17 from the rod holder arm 12. To reattach the rod holder arm 12 to the rod holder receptacle 17, the distal end 21 of the rod holder arm 12 is inserted into the rod holder arm receptacle 17 until the proximal end 23 of the latch 15 passes the locking portion 29 and the locking portion 29 reengages the slot 25 in the rod holder arm 12. As previously mentioned, the proximal end of the latch 17 is provided with a sloped or ramped end so that the distal end of the rod holder arm, which also has a tapered end portion can slide under the latch 15 and automatically lift the proximal end 23 of the latch 15 without having to manually press the distal end 55 of the latch 15.

The biasing spring 14 is positioned between a distal end portion of the lever 15 and the rod butt holder 6 to bias the distal end 55 of the lever 15 away from the rod butt holder 6 and thus bias the proximal end 23 of the lever 15 and the locking portion 29 into engagement with the transverse slot 25 in the rod holder arm 12. With the latch 15 engaged with the rod holder arm 12 (as shown in FIG. 2), the fishing rod blank 4 is thereby locked to the rod holder arm 12 and cannot dislodge therefrom without pressing the distal end 55 of the lever 15 toward the rod blank 4. Thus, even in the event of, for example, the capsizing of a watercraft to which the rod holder arm 12 may be attached or from the pull exerted by a fish on the rod blank 4, the rod butt holder 6 will remain attached to the rod holder arm 12. It is only when downward pressure is exerted by a hand or thumb of a user on the distal portion 55 of the latch 15 will the fishing rod blank 4 and associated handle 2 (see FIG. 1) be released from the rod holder arm 12.

As further show in FIGS. 2 and 3, the rod butt holder 6 includes a rod butt holder end cap 8, that is sized and shaped to be attached to the proximal end 61 of the rod butt holder 6 and is permanently attached thereto as with an adhesive or mechanical attachment. The end cap 8 includes a cylindrical insert portion 8' sized to be received within and secured to the proximal end of the rod butt holder 6. The head of the end cap 8 includes a tapered circumferential edge forming a frustoconical end cap 8. The end cap 8 prevents water or debris from entering the proximal end of the hollow rod blank 4 and also provides an abutment for the proximal end of the rod blank 4 when inserted into the rod butt holder 6.

As shown in FIGS. 1-3, the proximal end 12' of the rod holder arm 12 comprises a cylindrical portion having a hole extending therethrough for receiving a bolt of a fastener with a plurality of radially extending protrusions and grooves forming teeth configured to mate with a correspondingly configured plurality of radially extending protrusions and grooves forming teeth on a mounting member that prevents rotation of the rod holder arm 12 relative to the mounting member when engaged therewith and mounted thereto.

Figure 4:
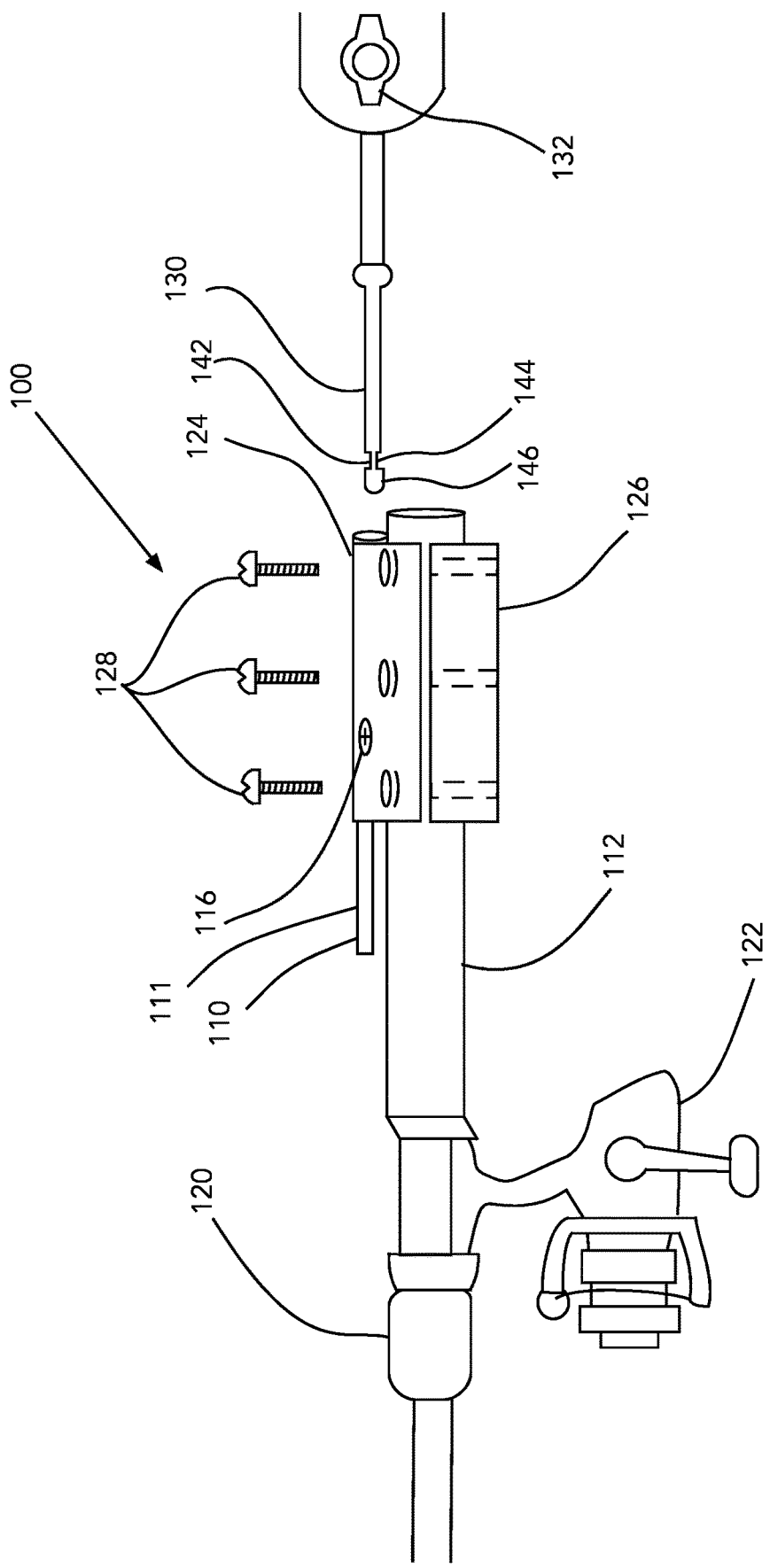
FIG. 4 is a left side plan view of another embodiment of an apparatus for coupling a fishing rod to a rod holder arm in accordance with the principles of the present invention.

Referring now to FIG. 4, there is illustrated an alternative embodiment of a rod butt assembly, generally indicated at 100, in accordance with the principles of the present invention. In this embodiment, the fishing rod 120 is fixed to the rod butt assembly 100 but not permanently attached thereto. The rod butt assembly 100 comprises a rod butt holder top 124 and rod butt holder bottom 126 forming contoured clam shell sections configured to be attached to one another and clamp around the fishing rod handle 1112 with the rod butt holder top 124 and rod butt holder bottom 126 secured to one another with a plurality of fasteners, such as threaded fasteners such as bolts 128. Both rod butt holder sections 124 and 126 have inner cylindrically shaped contours that are contoured and shaped to fit the circular contour and shape of a fishing rod handle 112 and are matching and opposed. However, there are differences in that the rod butt holder top 124 incorporates a latch assembly 110 including a latch member 111 and rod holder arm receptacle 124 (similar in configuration to the receptacle and latch assembly shown in FIG. 2) to accept a rod holder arm 130 in a manner as similarly described above with reference to FIG. 2. The rod holder arm 130 differs from the rod holder arm 12 shown in FIG. 2, however, in that the rod holder arm 140 includes a pair of opposed transverse slots 142 and 144, one on the top of the distal end portion 146 of the rod holder arm 130 and one on the bottom of the distal end portion 146 of the rod holder arm 130. This allows the rod holder arm 130 to be inserted into the receptacle 124 of the rod butt assembly 100 and engaged with the proximal end of the latch 110 (in a manner similar to the engagement of the latch 15 and rod holder arm 12 of FIG. 2) whether distal end 146 of the rod holder arm is inserted with the top side up or the bottom side up.

Figure 5:
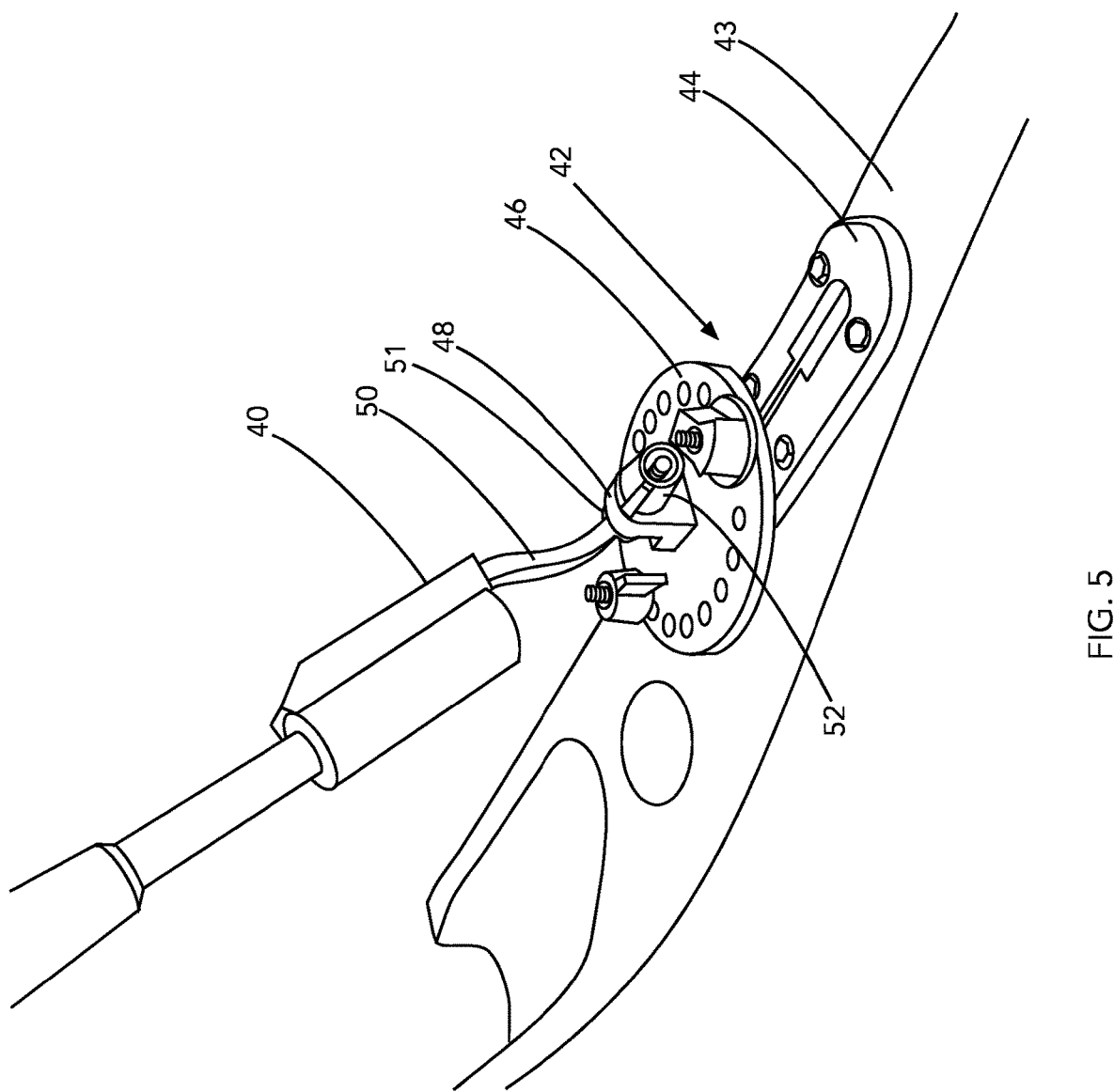
FIG. 5 is a left side perspective view of yet another embodiment of an apparatus for coupling a fishing rod to a rod holder arm with the rod holder arm attached to a mounting assembly attached to a boat in accordance with the principles of the present invention.

As further illustrated in FIG. 5, a rod holder assembly, generally indicated at 40, in a form configured similarly to those described with reference to FIGS. 1-3 above, and in accordance with the principles of the present invention, can be attached to a mounting assembly, generally indicated at 42, which is mounted to a mounting surface on a boat 43. The mounting assembly 42 is comprised of a mounting base 44 attached to the boat and a mounting plate 46 attached to the mounting base 44. The mounting plate 46 is configured to be rotatable and mountable in a plurality of orientations relative to the mounting base 44. The mounting plate 46 also includes a centrally located mounting member 48 to which a proximal end of the rod holder arm 50 is vertically and adjustably attached. By loosening the fastener 52, which comprises a bold and wing nut assembly, the rod holder arm 50 can be pivoted about the mounting member 48 to a desired position. The proximal end 51 is provided with a plurality of teeth (see FIG. 1) with a corresponding configuration of teeth provided on the mounting member 48. This allows for angular adjustment of the rod holder arm 50 relative to the mounting member 48 with a mechanical engagement of the relative teeth holding them to one another at a selected angle. Tightening the fastener 52 then holds the proximal end of the rod holder arm 50 to the mounting member 48 and the plate 46.

It is also noted that the rod holder assembly of the present invention as shown and described herein also serves as a rod holder allowing the angler to use both hands to tie on a new lure or unhook a fish. That is, the rod holder arm can be attached to a chest plate, such as the chest plate shown and described in U.S. Pat. No. 8,966,808B2, the entirety of which is incorporated by this reference. Adjusting the rod holder arm relative to the chest plate at an upward angle between about horizontal and vertical or at any angle therein between allows the fishing rod handle to be held up and fully supported by the chest harness. The rod holder assembly of the present invention thus allows a one-armed angler to cast a lure or bait with the fishing rod and then affix the fishing rod to their chest allowing them to reel the lure, bait or fish with only the use of one arm.

It should be noted that while the rod holder assembly of the present invention has been shown and described as having a particular configuration, other configurations could be employed without departing from the spirit and scope of the present invention. In the foregoing specification, the present invention has been described with reference to specific exemplary embodiments. Various modifications and changes may be made, however, without departing from the spirit and scope of the present invention as set forth in the claims, including combinations of elements of the various illustrated embodiments. The specification and figures are illustrative, not restrictive, and modifications are intended to be included within the scope of the present invention. Accordingly, the scope of the present invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The phrase "consisting essentially of" as used herein is intended to cover additional elements or functions that do not materially affect the basic and novel characteristics of the claimed invention. Thus, "consisting essentially of" is intended to encompass not only those components specifically listed, but also separate or additional components that do not materially alter the specifically recited functions or elements.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed is:

1. An apparatus for coupling a fishing rod to a support structure, comprising:
    a rod butt holder configured to attach to a proximal end portion of a fishing rod, the rod butt holder defining a tubular opening for receiving and retaining the proximal end portion of the fishing rod within the rod butt holder;
    an elongate rod holder arm having a proximal end portion configured to mount to a support structure and a linear distal end portion;
    an elongate rod holder arm receptacle having side walls that define a channel for receiving the linear distal end portion of the elongate rod holder arm therein; and
    a lever pivotally coupled to the side walls of the elongate rod holder arm receptacle and having a free end extending in a cantilevered manner from the elongate rod holder arm receptacle in a direction away from the elongate rod holder arm and on an opposite side of a pivot point of the lever, the free end configured to be pivoted by a hand of a user when grasping the rod butt holder and whereby pivoting the free end of the lever toward the fishing rod moves the lever from a locking position to an unlocking position to allow the linear distal end portion of the elongate rod holder arm to be disengaged from the elongate rod holder arm receptacle.

2. The apparatus of claim 1, wherein the lever comprises a downwardly extending locking portion and the elongate rod holder arm includes a transversely extending slot for receiving the locking portion when the lever is in the locking position, the locking portion configured to selectively engage the transversely extending slot of the elongate rod holder arm to selectively secure the rod butt holder to the elongate rod holder arm.

3. The apparatus of claim 2, wherein the lever is biased relative to the rod butt holder to force the locking portion of the lever into engagement with the transversely extending slot of the elongate rod holder arm.

4. The apparatus of claim 1, wherein the proximal end portion of the fishing rod is secured to the rod butt holder with arbor tape to form a friction fit between the rod butt holder and the proximal end portion of the fishing rod.

5. The apparatus of claim 2, wherein the elongate rod holder arm receptacle extends parallel to the rod butt holder.

6. The apparatus of claim 5, wherein the lever is pivotally coupled to the elongate rod holder arm receptacle with a latch pin extending through side walls of the elongate rod holder arm receptacle and through the lever, with the lever being freely pivotable relative to the latch pin.

7. The apparatus of claim 6, wherein the lever can pivot from the locking position to the unlocking position when the lever is pivoted about the latch pin in a manner that lowers a distal end of the lever and raises a proximal end of the lever until the locking portion is released from the transversely extending slot and the elongate rod holder arm can be removed from the elongate rod holder arm receptacle.

8. The apparatus of claim 7, wherein when the lever is in the locking position and the distal end of the elongate rod holder arm is fully inserted into the elongate rod holder arm receptacle, the locking portion engages the transversely extending slot and secures the elongate rod holder arm relative to the elongate rod holder arm receptacle.

9. The apparatus of claim 8, further comprising a coil spring biasing the lever into the locking position and wherein when the distal end of the lever is downwardly pressed toward the rod butt holder in an amount sufficient to overcome spring force of the coil spring, the proximal end of the lever is raised to the unlocking position and the elongate rod holder arm can be removed from the elongate rod holder arm receptacle.

10. The apparatus of claim 9, wherein the elongate rod holder arm is securable to the elongate rod holder arm receptacle by inserting the distal end of the elongate rod holder arm into the elongate rod holder arm receptacle until the locking portion of the lever passes the distal end of the elongate rod holder arm and the locking portion reengages the transverse extending slot in the elongate rod holder arm.

11. The apparatus of claim 10, wherein the proximal end of the lever is provided with a tapered end and the distal end of the elongate rod holder arm is tapered so that the distal end of the elongate rod holder arm can slide under and raise the proximal end of the lever to lift the proximal end of the lever until the locking portion engages the transversely extending slot to secure the elongate rod holder arm to the elongate rod holder arm receptacle.

12. The apparatus of claim 9, wherein the coil spring is positioned between a distal end portion of the lever and the rod butt holder to bias the distal end portion of the lever away from the rod butt holder and thus bias the proximal end of the lever and the locking portion into engagement with the transversely extending slot of the elongate rod holder arm.

13. The apparatus of claim 1, wherein the rod butt holder comprises a hollow cylinder and further comprising a rod butt holder end cap sized and shaped to be attached to a proximal end of the rod butt holder.

* * * * *